Patented Feb. 13, 1940

2,189,844

UNITED STATES PATENT OFFICE 2,189,844

TREATING MINERAL OIL

John V. Starr and Gustav A. Beiswenger, Elizabeth, N. J., assignors to Standard Oil Development Company, a corporation of Delaware No Drawing. Application October 18, 1933, Serial No. 694,034

9 Claims. (Cl. 196—13)

This invention relates to the art of treating mineral oils with a selective solvent for the production of high quality lubricating oils and more especially to the treatment of those fractions, either distillates or residues, which contain appreciable amounts of asphaltic material. The main object of the invention is the prevention of emulsification when asphalt-containing mineral oils are treated with selective solvents. This and related objects will be more fully understood from the following description.

As is well known, phenol is an excellent selective solvent for the purification of lubricating oil distillates. Its main action consists in the elimination from the distillate, by means of selective solution, of certain undesirable constituents which cause a rapid decrease of viscosity as the temperature is increased. It also removes from the distillate sulfur compounds, carbon, unstable fractions and other undesirable constituents. If the charge stock contains appreciable amounts of asphaltic material it tends to emulsify with the solvent and makes stratification extremely difficult, if not impossible. Furthermore, when the oil to be treated is of high specific gravity and viscous, the separation of a purified oil layer from the solvent layer is neither rapid nor complete. The conditions are similar with other selective solvents such as furfural (furfuryl alcohol, aniline etc.). Obviously, these conditions preclude the possibility of using selective solvents for the treatment of heavy residual oils.

We have discovered that selective solvents, especially those having a specific gravity of less than about 1 may be successfuly used for the treatment of asphalt-containing mineral oils if another, high specific gravity organic compound having a high solvent action for the asphalt is added to the selective solvent. The organic asphalt solvent should have a specific gravity higher than that of water. If the oil is treated with such a solvent mixture the tendency to emulsify is reduced. The use of an added solvent with high specific gravity promotes rapid stratification. Also, if the added component is itself a selective solvent for unsaturates, the selectivity of the mixture is not impaired and high yields of purified oil are obtained.

The solvent mixture is used in exactly the same manner for the treatment of mineral oils as the simple selective solvent. The oil to be treated is agitated with the solvent mixture, then allowed to settle and the oil layer is separated from the solvent layer. The oil layer contains some solvent which is removed by means of distillation and fractionation. The solvent layer contains the extracted undesirable constituents and is segregated therefrom by means of distillation and fractionation. The treating may be carried out either continuously or in batch. Often it is advantageous to divide the solvent mixture into several portions and treat the mineral oil with these portions in successive batches.

The amount of the added solvent may vary considerably, say from 5 to as much as 50% but we have found 20–25% to be satisfactory. The added solvent must have a specific gravity higher than 1. Halogenated derivatives of ethylene, ethane, benzene, etc., are especially adapted for use as added solvent. The following solvents when used in admixture with phenol showed characteristics as listed below:

| | Solvency for asphalt | Spec. gravity | Selectivity |
|---|---|---|---|
| Halogen compounds, e. g.— | | | |
| Carbon tetrachloride | Good | 1.595 | Fair. |
| Trichlorethylene | do | 1.476 | Good. |
| Ethylene dichloride | do | 1.265 | Do. |
| Tetrachlorethane | do | 1.600 | Excellent. |
| Chlorbenzene | do | 1.106 | Good. |
| p-Dichlorbenzene | do | 1.26 | Excellent. |

As other solvents for asphalt ethylene dibromide, brombenzene, etc. may be mentioned, diphenyl ether, further high specific gravity tar bases (organic bases) such as quinoline, organic bases recovered from California type petroleums, etc.

By the term "tar bases" is intended to mean the basic compounds derived by extraction of wood tar or coal tar with mineral acids, it being understood, of course, that tar bases having a preferred specific gravity greater than 1 may be separated by any suitable means from mixtures containing same.

The following examples will illustrate our process.

A mixture of Oklahoma City and Burbank crude was reduced by fire and steam to a residuum amounting to 43% of the crude and having a gravity of 22.8° A. P. I., flash 360° F., viscosity Saybolt at 210° F. 68 seconds and viscosity index of 71. This was treated with 2 dumps each 100% by volume at 100° F. with a mixed solvent comprising 4 parts by volume of phenol and 1 part by volume of mono-chlor benzene. The major portion of the asphaltic material settled to the bottom layer with the extracted (naphthenic) oil. The treated oil layer was then further treated with two dumps each 100% by volume of phenol at 150° F. Stratification of the mixture into extract and treated oil layers was rapid and complete. The treated oil was then stripped of phenol by vacuum distillation, reduced to the viscosity of the charge stock and decolorized by contact filtration with activated clay. The product amounted to 65% of the original charge stock and showed the following inspections:

| | |
|---|---|
| Gravity | 29.5° A. P. I. |
| Flash | 400° F. |
| Viscosity, Saybolt at 210° F | 69 |
| Viscosity index | 104 |
| Conradson carbon residue | 0.51% |
| Color, Robinson | 3 |
| Pour | 65° F. |

Deep Sand Reagan crude was reduced by fire and steam to a residual of 24.9° A. P. I. gravity, viscosity Saybolt at 210° F. 135 and viscosity Index 85. The raw residual was then treated with 2 × 100% by volume of a solvent comprising 4 parts (vol.) phenol and 1 part (vol.) of tetrachlorethane at 100° F. The mixture in each case was allowed to stratify and it was found that the asphaltic material which settled with the extracted oil could be withdrawn almost completely. The treated oil layer was further treated with 2 × 100% of phenol at 150° F. The treated oil was then stripped of phenol by vacuum distillation, and decolorized by contact filtration with an activated clay. A yield of 75% of treated oil was obtained. This was dewaxed giving a finished oil of:

| | |
|---|---|
| Gravity | 28.3° A. P. I. |
| Flash | 505° F. |
| Viscosity, Saybolt at 210° F | 99 |
| Viscosity index | 101 |
| Color, Robinson | 1¼ |
| Pour | 45° F. |

Our process may be modified in different ways; thus, for example, a mixture of two or more high specific gravity organic solvents may be used as the added solvent, also the asphalt solvent may be added directly to a particular stage of the treater. Other modifications will be apparent to those skilled in the art. Our invention is not to be limited by the examples given for illustration, but only by the following claims in which it is our intention to claim all novelty inherent in the process.

What we claim is:

1. Process of treating mineral oil, containing asphalt which comprises agitating the oil with a solvent mixture comprising a solvent having a selective solvent action on certain undesirable constituents which cause a rapid decrease of viscosity as the temperature is increased, said solvent being selected from the group consisting of phenol, furfural, furfuryl alcohol and aniline, and also comprising about 5 to 50% of a halogenated hydrocarbon having a specific gravity greater than 1, allowing the formation of two layers, separating the oil layer from the solvent layer and removing any dissolved solvent from the oil layer to obtain a treated oil.

2. The process of treating mineral oil containing asphalt, which comprises extracting same with a mixture comprising a selective solvent of the phenol type and a halogenated hydrocarbon having a specific gravity higher than 1.

3. Process according to claim 2 in which the solvent mixture consists of phenol and chlorbenzene.

4. The process of treating mineral oil containing asphalt for the preparation of lubricating oils, which comprises treating the oil at least once with a solvent consisting of a major proportion of phenol and a minor proportion of a halogenated hydrocarbon having per se a good solvency for asphalt and a specific gravity greater than 1, allowing the formation of two layers, separating the oil layer from the solvent layer and removing any dissolved solvent from the oil layer to obtain a treated oil.

5. The process of treating mineral oil containing asphalt which comprises extracting the same with a mixture consisting of phenol and tetrachlorethane.

6. The process of treating mineral oil containing asphalt for the preparation of lubricating oils, which comprises treating the oil at a temperature of about 100° F. at least once with a solvent consisting of a major proportion of phenol and a minor proportion of halogenated hydrocarbon having per se a good solvency for asphalt and a specific gravity greater than 1, allowing the formation of two layers, separating the oil layer from the solvent layer, removing any dissolved solvent from the oil layer to obtain a treated oil, and subjecting the treated oil to at least one additional treatment with a selective solvent of the phenol type at a more elevated temperature.

7. The process of treating a residual asphalt-containing fraction of petroleum which comprises extracting the same with a mixture comprising a selective solvent of the phenol type and a halogenated hydrocarbon having a specific gravity higher than 1.

8. Process in accordance with claim 2 in which said halogenated hydrocarbon is tetrachlorethane.

9. Process in accordance with claim 2 in which said halogenated hydrocarbon is p-dichlorbenzene.

JOHN V. STARR.
GUSTAV A. BEISWENGER.